(No Model.)
W. N. BRENNAN.
SEAL LOCK.
No. 432,723. Patented July 22, 1890.
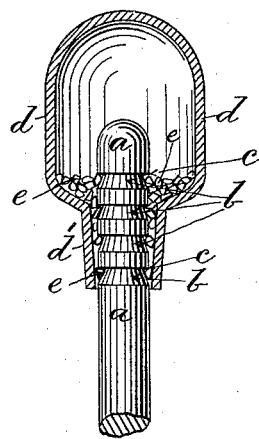
WITNESSES
Jos. W. Crookes.
J. K. Hornsby
INVENTOR
William N. Brennan
Paul Bakewell
his attorney.

UNITED STATES PATENT OFFICE.

WILLIAM N. BRENNAN, OF ST. LOUIS, MISSOURI.

SEAL-LOCK.

SPECIFICATION forming part of Letters Patent No. 432,723, dated July 22, 1890.

Application filed December 20, 1889. Serial No. 334,395. (No model.)

*To all whom it may concern:*

Be it known that I, WILLIAM N. BRENNAN, a citizen of the United States, residing at the city of St. Louis, State of Missouri, have invented a certain new and useful Improved Sealing Device for the Bolts of Staples or other Fastenings, of which the following is a full, clear, and exact description.

My invention relates to improved means of sealing the bolts or pins used for staples or other fastenings, and has for its object to prevent the withdrawal of a bolt from its fastening without destruction of the seal and consequent detection.

It consists in features of novelty, as hereinafter claimed.

In the accompanying drawing the figure represents a sectional view of my improved seal applied to a bolt broken away.

$a$ represents the end portion of a bolt, which is inserted through and projects beyond the staple or other provision of the fastening therefor. Around the end portion $a$ of the bolt are formed, at suitable distances apart, one or more grooves $b$, each groove $b$ being either tapered from the full diameter of the bolt, so as to terminate in a square or circular shoulder $c$ toward the end of the bolt, as shown, or of a square, concave, or any other desirable shape.

$d$ represents a seal, made in any shape, of glass, earthenware, or other frangible material, and having a neck $d'$, the interior of which is slightly larger than the end portion $a$ of the bolt, and either of an increasing taper from its mouth toward the interior of the seal $d$ or parallel throughout, as found preferable. Within the seal $d$ are placed various angular or spherical shaped fragments $e$, of metallic or other substance, so that when the bolt is in the fastened position and the neck $d'$ of the seal $d$ passed over the end portion $a$ of the bolt, which partially enters the seal $d$, the fragments $e$ within the latter congregate around the inner open end of the annular space between the neck $d'$ and the end portion $a$ of the bolt, and some of the fragments $e$, entering the said space, engage in the grooves $b$, and thereby become wedged between the latter and the neck $d'$, so that the seal $d\ d'$ cannot be removed from the bolt without being broken. Private numbers or marks may be blown or otherwise formed on the seal $d\ d'$, so that a similar seal cannot be substituted without detection.

My invention is particularly applicable to sealing the fastenings of freight-car doors, but can be used for other purposes.

I claim as my invention—

In a seal for a fastening-bolt, the combination of a seal made of frangible material and having a neck, said seal containing fragments of metallic or other substance, with the bolt having one or more circumferential grooves, substantially as shown, and for the purpose described.

In testimony whereof I have affixed my signature in presence of two witnesses.

WILLIAM N. BRENNAN.

Witnesses:
J. L. HORNSBY,
JOS. W. CROOKES.